US011597030B2

(12) United States Patent
Omori et al.

(10) Patent No.: US 11,597,030 B2
(45) Date of Patent: Mar. 7, 2023

(54) RESISTANCE WELDER CONTROLLER

(71) Applicant: Dengensha Toa Co., Ltd., Kawasaki (JP)

(72) Inventors: Noburo Omori, Kanagawa (JP);
Takeshi Fukuzawa, Kanagawa (JP);
Yasuhiko Fukuta, Kanagawa (JP)

(73) Assignee: Dengensha Toa Co., Ltd., Kawasaki (JP)

( * ) Notice: Subject to any disclaimer, the term of this patent is extended or adjusted under 35 U.S.C. 154(b) by 402 days.

(21) Appl. No.: 16/959,007

(22) PCT Filed: Aug. 8, 2019

(86) PCT No.: PCT/JP2019/031520
§ 371 (c)(1),
(2) Date: Jun. 29, 2020

(87) PCT Pub. No.: WO2020/100363
PCT Pub. Date: May 22, 2020

(65) Prior Publication Data
US 2020/0331089 A1  Oct. 22, 2020

(30) Foreign Application Priority Data
Nov. 15, 2018  (JP) .............................. JP2018-214969

(51) Int. Cl.
*B23K 11/00* (2006.01)
*B23K 11/24* (2006.01)
(Continued)

(52) U.S. Cl.
CPC .............. *B23K 11/241* (2013.01); *G07C 3/02* (2013.01); *H02M 3/335* (2013.01); *B23K 11/115* (2013.01)

(58) Field of Classification Search
CPC ...... H03K 1/0004; H03K 9/067; H03K 11/00; H03K 11/24; H03K 11/241; B23K 11/00; B23K 11/241; B23K 9/067; B23K 9/073
(Continued)

(56) References Cited

U.S. PATENT DOCUMENTS

| 5,406,045 A * | 4/1995 | Kiriishi | B23K 11/257 |
| | | | 219/110 |
| 7,968,815 B2 * | 6/2011 | Murai | B23K 11/314 |
| | | | 219/86.25 |
| 9,266,187 B2 * | 2/2016 | Cohen | B23K 11/257 |

FOREIGN PATENT DOCUMENTS

| JP | H01-118377 A | 5/1989 |
| JP | 107-276064 A | 10/1995 |

(Continued)

OTHER PUBLICATIONS

Office Action of corresponding China application CN 201980006367. 5; dated May 6, 2021; 15 pages.
(Continued)

*Primary Examiner* — Hai L Nguyen
(74) *Attorney, Agent, or Firm* — Young Basile Hanlon & MacFarlane, P.C.

(57) ABSTRACT

A resistance welder controller controls a welding current flowing through an inverter transformer, detects the welding current flowing through the inverter transformer, measures an energizing time and a point time interval of the detected welding current, calculates a usage rate of the inverter transformer using the energizing time and the point time interval, stores an equivalent current curve indicating a relationship between a current value of the welding current and the usage rate of the inverter transformer when the inverter transformer is operated at a rated capacity, and determines whether a relationship between the current value and the calculated usage rate of the inverter transformer (Continued)

exceeds the rated capacity of the inverter transformer based on the equivalent current curve, continues an operation when the relationship does not exceed the rated capacity of the inverter transformer, and stops the operation when the relationship exceeds the rated capacity of the inverter transformer.

6 Claims, 4 Drawing Sheets

(51) Int. Cl.
   *G07C 3/02* (2006.01)
   *H02M 3/335* (2006.01)
   *B23K 11/11* (2006.01)

(58) Field of Classification Search
   USPC .......................................... 219/50, 55, 86.1
   See application file for complete search history.

(56) References Cited

FOREIGN PATENT DOCUMENTS

| | | |
|---|---|---|
| JP | H08-141747 A | 6/1996 |
| JP | H09-85455 A | 3/1997 |
| JP | 2000-176648 A | 6/2000 |
| JP | 2016-140886 A | 8/2016 |

OTHER PUBLICATIONS

Office Action of corresponding application CA 3,083,399, dated Aug. 9, 2021; 8 pages.
Office Action of corresponding China application CN 201980006367.5; dated Aug. 23, 2021; 13 pages with translation.
Extended European Search Report of corresponding application EP 19883362.6; dated Oct. 14, 2021; 5 pages.

\* cited by examiner

[FIG 1]
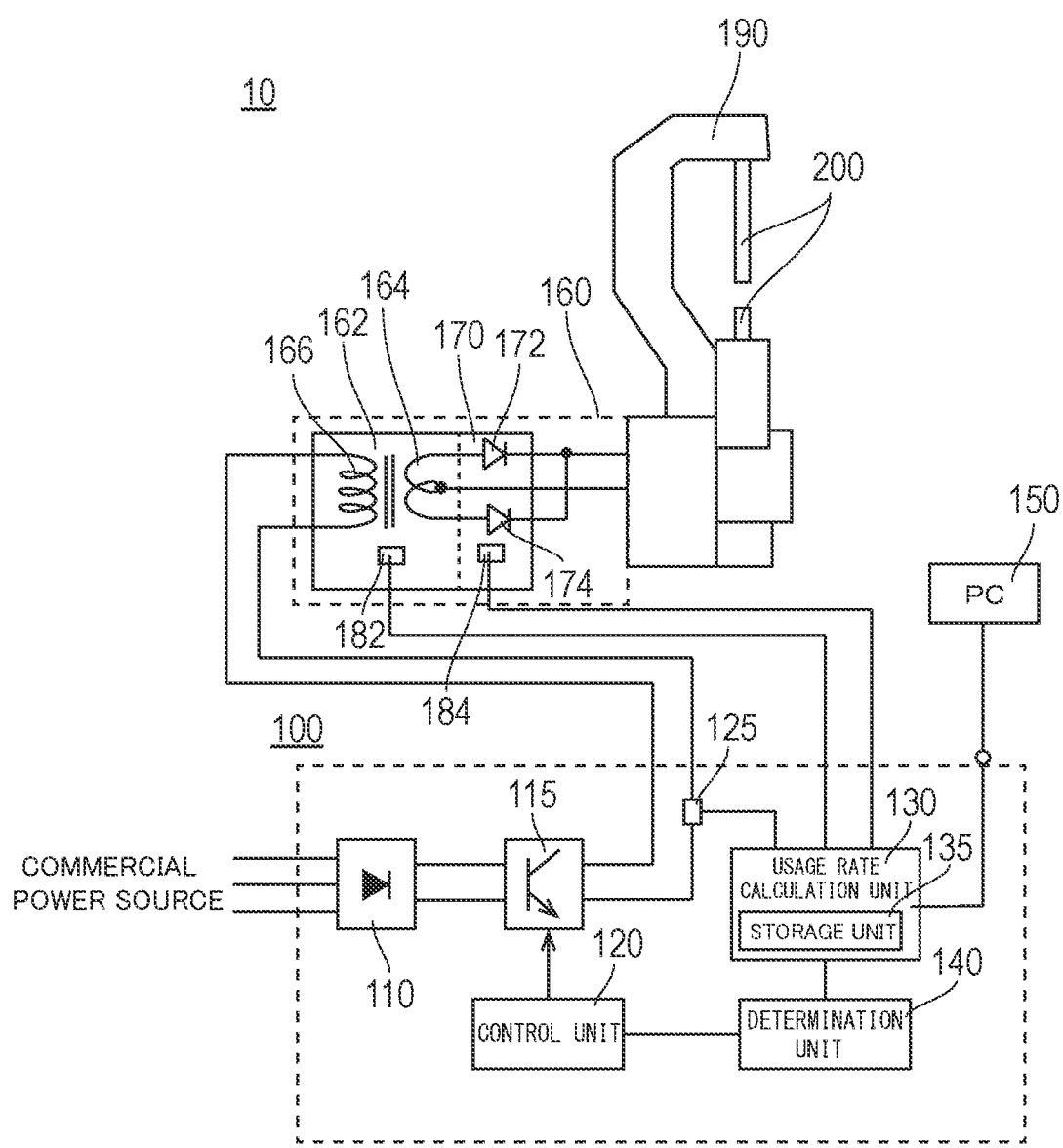

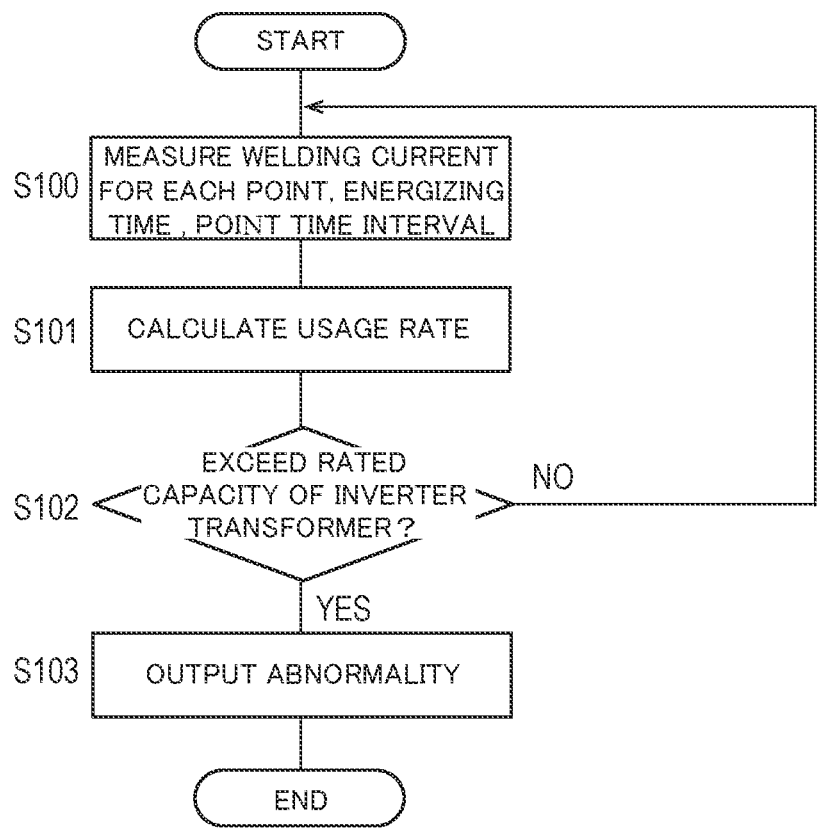

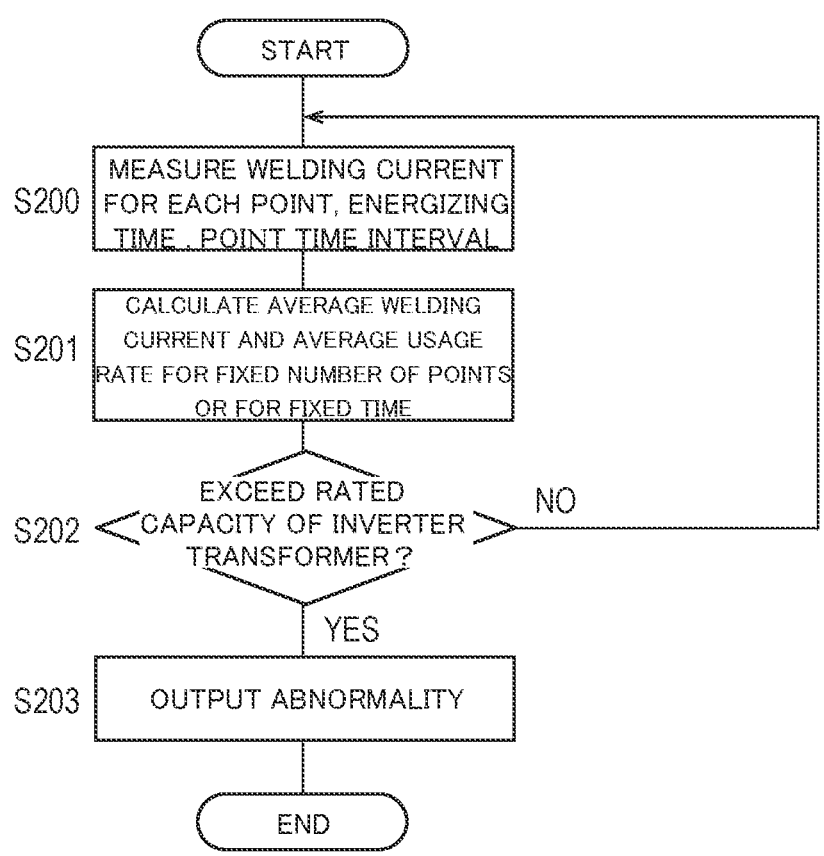

[FIG 4]
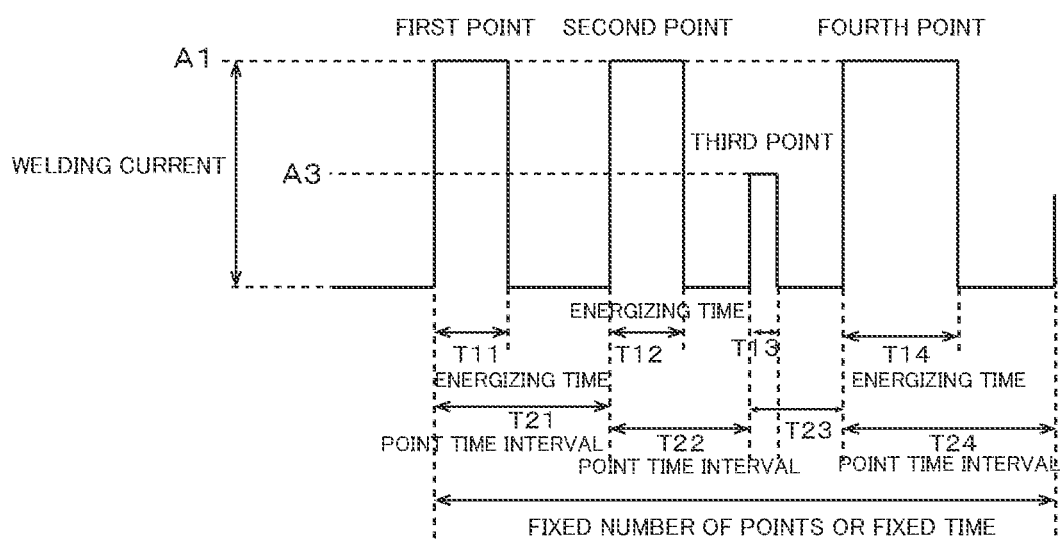
[FIG 5]
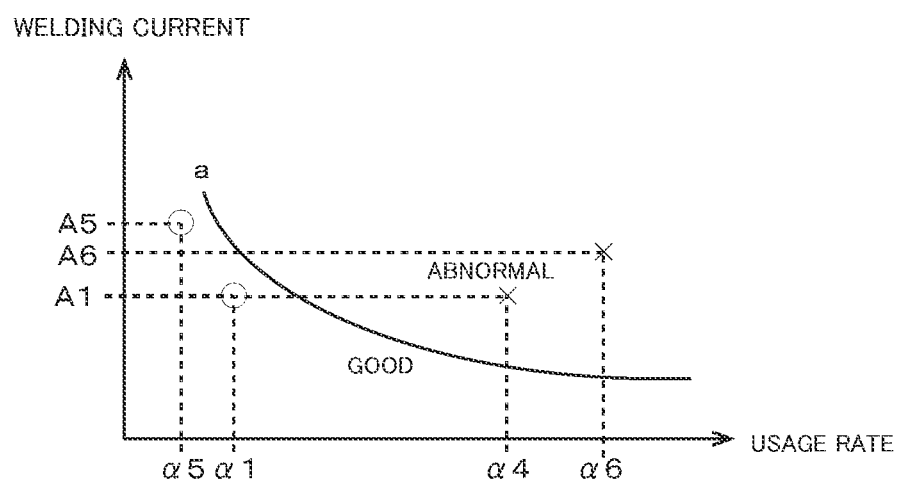

RESISTANCE WELDER CONTROLLER

CROSS-REFERENCE TO RELATED APPLICATIONS

The present application is a 371 application of International Patent Application Serial No. PCT/JP2019/031520, filed Aug. 8, 2019, which claims priority to and the benefit of Japanese Patent Application No. 2018-214969 filed Nov. 15, 2018, the entire contents of which are incorporated herein by reference.

TECHNICAL FIELD

The present invention relates to a resistance welder controller that controls operations of a resistance welder in consideration of a welding current and a usage rate of the resistance welder.

BACKGROUND

In recent years, high tensile steel plates having higher tensile strength than conventional steel plates have been used for automobile bodies in order to secure strength and reduce weight. When high tensile steel plates are spot-welded, it is necessary to energize a larger welding current for a longer time than when the conventional steel plates are spot-welded. Consequently, an inverter-type resistance welder that can set a wide range of welding conditions and perform high-quality welding is used to spot-weld the high tensile steel plates. In general, the inverter-type resistance welder is not used being continuously energized. Thus, as shown in JP H8-141747 A, the resistance welder is operated in consideration of a usage rate that is a ratio of time when the resistance welder can be energized within a fixed period of time.

SUMMARY

However, in spot-welding of high tensile steel plates in recent years, welding conditions such as a welding current, an energizing time, and a point time interval are varied at every welding point in order to achieve high quality welding at every welding point. Thus, when the resistance welder is operated in consideration of only the usage rate as in JP H8-141747 A, the following problems occur.

An inverter transformer used in the inverter-type resistance welder may be used in excess of a rated capacity in spot-welding between high tensile steel plates. This adversely affects the life of the inverter transformer. Since an electric capacity varies depending on the welding conditions to be used, it is difficult to manage the electric capacity so as not to exceed the rated capacity in consideration of only the usage rate.

The present invention has been made in order to solve the above conventional problem. An object of the present invention is to provide a resistance welder controller that controls operations of a resistance welder in consideration of a welding current and a usage rate of the resistance welder.

A resistance welder controller according to the present invention for achieving the above object includes a control unit that controls a welding current flowing through an inverter transformer, a current detection unit that detects the welding current flowing through the inverter transformer, a usage rate calculation unit that measures an energizing time and a point time interval of the welding current that has been detected, and calculates a usage rate of the inverter transformer using the energizing time and the point time interval that have been measured, a storage unit that stores an equivalent current curve indicating a relationship between a current value of the welding current and the usage rate of the inverter transformer when the inverter transformer is operated at a rated capacity, and a determination unit that determines whether a relationship between the current value of the detected welding current and the calculated usage rate of the inverter transformer exceeds the rated capacity of the inverter transformer based on the equivalent current curve, continues an operation of the control unit when the relationship between the current value of the detected welding current and the calculated usage rate of the inverter transformer does not exceed the rated capacity of the inverter transformer, and stops the operation of the control unit when the relationship between the current value of the detected welding current and the calculated usage rate of the inverter transformer exceeds the rated capacity of the inverter transformer.

According to the resistance welder controller of the present invention, an operation of the resistance welder is controlled in consideration of the welding current and the usage rate of the resistance welder, and thus the resistance welder can be operated within a range not exceeding the rated capacity of the resistance welder, and the life of the resistance welder can be extended.

BRIEF DESCRIPTION OF THE DRAWINGS

FIG. 1 is a schematic configuration diagram of a resistance welder including a resistance welder controller of the embodiment;

FIG. 2 is an operation flowchart of the resistance welder controller of the embodiment in a usage rate measurement mode;

FIG. 3 is an operation flowchart of the resistance welder controller of the embodiment in an average usage rate measurement mode;

FIG. 4 is a diagram provided for explanation of an operation of the operation flowcharts of FIGS. 2 and 3; and FIG. 5 is a diagram provided for explanation of the operation of the operation flowcharts of FIGS. 2 and 3.

DETAILED DESCRIPTION

Hereinafter, an embodiment of a resistance welder controller according to the present invention will be described in detail with reference to the drawings. FIG. 1 is a schematic configuration diagram of a resistance welder including the resistance welder controller of the embodiment.

Configuration of Resistance Welder

The resistance welder 10 includes an inverter transformer 160 that supplies a welding current to electrodes 200 of a welding gun 190, and the resistance welder controller 100 that controls operations of the inverter transformer 160.

The inverter transformer 160 is provided in a part of the welding gun 190, and supplies the welding current between the electrodes 200 of the welding gun 190. The inverter transformer 160 has a transformer 162 that generates the welding current, and a diode stack 170 that rectifies the welding current generated by the transformer 162. The transformer 162 has a primary winding 166 and a secondary winding 164, and a current flowing through the primary winding 166 is amplified to a current corresponding to a winding ratio and supplied to the secondary winding 164.

The diode stack 170 has diodes 172 and 174, and the diodes 172 and 174 convert an AC welding current flowing through the secondary winding 164 into a DC welding current. The welding current converted into the DC is supplied to a steel plate (not shown) pressured between the electrodes 200, and the steel plate is spot-welded by the electrodes 200.

The inverter transformer 160 is provided with a temperature detection unit that detects a temperature of the inverter transformer 160. The temperature detection unit has a transformer temperature detection unit 182 that detects a temperature of the transformer 162 that generates the welding current, and the rectifier temperature detection unit 184 that detects a temperature of the diode stack 170 as a rectifier that rectifies the welding current generated by the transformer 162.

Configuration of Resistance Welder Controller

The resistance welder controller 100 controls operations of the resistance welder 10 in consideration of the welding current and a usage rate of the resistance welder 10.

The resistance welder controller 100 includes a rectification unit 110, a switching unit 115, a control unit 120, a current detection unit 125, a usage rate calculation unit 130, a storage unit 135, a determination unit 140, a PC 150 as an external computer, the transformer temperature detection unit 182, and the rectifier temperature detection unit 184.

The rectification unit 110 is connected to a three-phase commercial power source, converts, for example, three-phase 50 Hz AC into DC, and supplies power to all components of the resistance welder controller 100. The switching unit 115 is switched by a switching signal output from the control unit 120, and outputs a voltage corresponding to welding conditions. The control unit 120 controls the welding current flowing through the inverter transformer 160 by the switching signal output to the switching unit 115. The current detection unit 125 detects the welding current flowing through the inverter transformer 160.

The usage rate calculation unit 130 measures an energizing time and a point time interval of the welding current detected by the current detection unit 125. Further, the usage rate calculation unit 130 measures the temperature of the transformer 162 detected by the transformer temperature detection unit 182 and the temperature of the diode stack 170 detected by the rectifier temperature detection unit 184. Further, the usage rate calculation unit 130 calculates the usage rate of the inverter transformer 160 using the energizing time and the point time interval that have been measured.

The usage rate calculation unit 130 includes the storage unit 135 therein. The storage unit 135 stores an equivalent current curve indicating a relationship between a current value of the welding current when the inverter transformer 160 is operated at a rated capacity and the usage rate of the inverter transformer 160.

The usage rate calculation unit 130 has two measurement modes of a "usage rate measurement mode" and an "average usage rate measurement mode" as measurement modes for calculating the usage rate. When the usage rate measurement mode is activated, the usage rate calculation unit 130 measures the energizing time and the point time interval of the welding current detected by the current detection unit 125 for each point, and calculates the usage rate of the inverter transformer 160 using the measured energizing time and the point time interval. When the average usage rate measurement mode is activated, the usage rate calculation unit 130 measures the energizing time and the point time interval of the welding current detected by the current detection unit 125 for each of a plurality of points or for a fixed time. The usage rate calculation unit 130 calculates an average energizing time or an average point time interval for each of the plurality of points or for the fixed time that have been measured. Then, the usage rate calculation unit 130 calculates the usage rate of the inverter transformer 160 using the average energizing time or average point time interval that have been calculated.

The determination unit 140 determines whether the relationship between the current value of the welding current detected by the current detection unit 125 and the usage rate of the inverter transformer 160 calculated by the usage rate calculation unit 130 exceeds the rated capacity of the inverter transformer 160 based on the equivalent current curve stored in the storage unit 135. When the relationship between the current value of the detected welding current and the calculated usage rate of inverter transformer 160 does not exceed the rated capacity of the inverter transformer 160, the determination unit 140 continues an operation of the control unit 120. When the relationship between the current value of the detected welding current and the calculated usage rate of the inverter transformer 160 exceeds the rated capacity of the inverter transformer 160, the determination unit 140 stops the operation of the control unit 120.

The determination unit 140 plots an intersection of the current value of the welding current detected by the current detection unit 125 and the usage rate of the inverter transformer 160 calculated by the usage rate calculation unit 130 on a graph drawn using the equivalent current curve stored in the storage unit 135. When the plotted intersection is positioned below the equivalent current curve, the determination unit 140 determines that the relationship between the current value of the detected welding current and the calculated usage rate of the inverter transformer 160 does not exceed the rated capacity of the inverter transformer 160. When the plotted intersection is positioned above the equivalent current curve, the determination unit 140 determines that the relationship between the current value of the detected welding current and the calculated usage rate of the inverter transformer 160 exceeds the rated capacity of the inverter transformer 160.

The equivalent current curve stored in the storage unit 135 is a curve obtained from experience on site or an experiment. In general, the equivalent current curve a is obtained by calculating the welding current (KA)×the usage rate $\alpha^{1/2}$. The usage rate is calculated by converting to an arbitrary current value. This is because, for example, when a welding process of an automobile is considered, it is necessary to consider the total usage rate of continuous points. The equivalent current curve (see FIG. 5) suggests that, in order to use the inverter transformer 160 within a range of the rated capacity, a large welding current can be passed when the usage rate is small, but only a small welding current can be obtained as the usage rate increases. The equivalent current curve varies depending on a size of the resistance welder 10 and a manner of welding. For every resistance welder 10, the equivalent current curve optimal for the resistance welder 10 is used.

The PC 150 is connected to the usage rate calculation unit 130. The current value, the energizing time, and the point time interval of the welding current for each point detected by the current detection unit 125, and the usage rate of the inverter transformer 160 calculated by the usage rate calculation unit 130 are transmitted to the PC 150 as the external computer. The PC 150 stores and monitors the current value, the energizing time, and the point time interval of the welding current, and the usage rate of the inverter transformer 160. Further, the current value of the welding current detected by current detection unit 125 and the usage rate of inverter transformer 160 calculated by usage rate calculation unit 130 are transmitted to the PC 150. The PC 150 plots the intersection of the current value of the detected welding current and the calculated usage rate of the inverter transformer 160 on the graph drawn using the equivalent current curve stored in the storage unit 135. The PC 150 monitors whether the relationship between the current value of the welding current and the usage rate of the inverter transformer 160 exceeds the rated capacity of the inverter transformer 160. Further, the temperature of the inverter transformer 160 detected by the temperature detection unit is transmitted to the PC 150, and the temperature of the inverter transformer 160 is stored and monitored by the PC 150.

Operation of Resistance Welder Controller

[Usage rate measurement mode]

FIG. 2 is an operation flowchart of the resistance welder controller 100 of the embodiment in the usage rate measurement mode. The operation in the usage rate measurement mode will be described with reference to FIGS. 4 and 5.

When the usage rate measurement mode is activated in the usage rate calculation unit 130, the usage rate calculation unit 130 first measures the current value of the welding current for each point, the energizing time of the welding current, and the point time interval of the welding current detected by the current detection unit 125 (S100). For example, as shown in FIG. 4, a current value A1 of the welding current at a first point, an energizing time T11 of the welding current at the first point, a point time interval T21 of the welding current at the first point, the current value A1 of the welding current at a second point, an energizing time T12 of the welding current at the second point, a point time interval T22 of the welding current at the second point, a current value A3 of the welding current at a third point, an energizing time T13 of the welding current at the third point, a point time interval T23 of the welding current of the third point, the current value A1 of the welding current of a fourth welding point, an energizing time T14 of the welding current of the fourth point, and a point time interval T24 of the welding current of the fourth point are measured for each point.

Next, the usage rate calculation unit 130 calculates the usage rate of the inverter transformer 160 using the energizing time and the point time interval that have been measured in step S100 (S101). For example, in a case of FIG. 4, a usage rate α1 of the inverter transformer 160 at the first point can be obtained as α1=T11/T21, a usage rate α2 of the inverter transformer 160 at the second point can be obtained as α2=T12/T22, a usage rate α3 of the inverter transformer 160 at the third point can be obtained as α3=T13/T23, and a usage rate α4 of the inverter transformer 160 at the fourth point can be obtained as α4=T14/T24.

Next, the determination unit 140 determines whether a relationship between the current value of the welding current for each point measured in step S100 and the usage rate of the inverter transformer 160 for each point calculated in step 101 exceeds the rated capacity of the inverter transformer 160 based on the equivalent current curve stored in the storage unit 135. That is, it is determined whether the relationship between the welding current and the usage rate exceeds the rated capacity of the inverter transformer 160 (S102).

For example, as shown in FIG. 5, when the current value of the welding current at the first point is A1, and the usage rate of the welding current at the first point is α1, the determination unit 140 plots an intersection of the current value A1 and the usage rate α1 on the graph drawn using the equivalent current curve a stored in the storage unit 135. When the plotted intersection is positioned below the equivalent current curve a, the determination unit 140 determines that a relationship between the current value A1 and the usage rate α1 does not exceed the rated capacity of the inverter transformer 160 (S102: NO). When the relationship does not exceed the rated capacity, the determination unit 140 continues the operation of the control unit 120 and repeats the processing of steps S100 and S101.

Meanwhile, for example, as shown in FIG. 5, when the current value of the welding current at the fourth point is A1, and the usage rate of the welding current at the fourth point is α4, the determination unit 140 plots an intersection of the current value A1 and the usage rate α4 on the graph drawn using the equivalent current curve a stored in the storage unit 135. When the plotted intersection is positioned above the equivalent current curve a, the determination unit 140 determines that a relationship between the current value A1 and the usage rate α4 exceeds the rated capacity of the inverter transformer 160 (S102: YES). When the relationship exceeds the rated capacity, the determination unit 140 stops the operation of the control unit 120 and outputs an abnormality (S103). The abnormality is output for each point. For example, when it is determined that the relationship exceeds the rated capacity at a completion of the third point, an abnormality is output before welding at the fourth point. When an abnormality is output, the resistance welder controller 100 demonstrates the abnormality with an alarm sound or a patrol light and outputs an abnormality signal to an external device such as the PC 150. The abnormality signal includes a contact signal and abnormal data, and the abnormal signal is output to the external device by wire or wirelessly. Note that when the abnormality is output, there is no recovering until the output is reset.

As described above, when the usage rate measurement mode is activated, it is determined for each point whether the rated capacity of the inverter transformer 160 is exceeded or not exceeded. The resistance welder 10 can be thus operated within a range not exceeding the rated capacity of the resistance welder 10, and the diodes 172 and 174 included in the inverter transformer 160 can be protected from overheating. This can extend the life of the diode stack 170 and reduce a frequency of replacement of the diode stack 170. Further, considering that the replacement of the diode stack 170 takes a significant amount of time, production efficiency of a welding line can be improved.

[Average usage rate measurement mode]

FIG. 3 is an operation flowchart of the resistance welder controller 100 of the embodiment in the average usage rate measurement mode. The operation in the average usage rate measurement mode will be described with reference to FIGS. 4 and 5.

When the average usage rate measurement mode is activated in the usage rate calculation unit 130, the usage rate calculation unit 130 first measures the current value of the welding current for each point, the energizing time of the welding current, and the point time interval of the welding current detected by the current detection unit 125 (S200). For example, as shown in FIG. 4, a current value A1 of the welding current at a first point, an energizing time T11 of the welding current at the first point, a point time interval T21 of the welding current at the first point, the current value A1 of the welding current at a second point, an energizing time T12 of the welding current at the second point, a point time interval T22 of the welding current at the second point, a current value A3 of the welding current at a third point, an energizing time T13 of the welding current at the third point, a point time interval T23 of the welding current of the third point, the current value A1 of the welding current of a fourth welding point, an energizing time T14 of the welding current of the fourth point, and a point time interval T24 of the welding current of the fourth point are measured for each point. The above measured data is temporarily stored in the storage unit.

Next, the usage rate calculation unit 130 calculates the current value and the average usage rate of the average welding current at a fixed number of points or for a fixed time, using the energizing time and the point time interval measured in step S200 (S201). For example, when the fixed number of points is set to four, in the case of FIG. 4, the current value of the average welding current is (A1×3+A3)/4, and the average usage rate is (T11+T12+T13+T14)/(T21+T22+T23+T24). Note that the concept is the same in the case of the fixed time instead of the fixed number of points.

Next, the determination unit 140 determines whether a relationship between the current value of the average welding current for each fixed number of points measured in step S201 and the average usage rate of the inverter transformer 160 for each fixed number of points exceeds the rated capacity of the inverter transformer 160 based on the equivalent current curve stored in the storage unit 135. That is, it is determined whether the relationship between the average welding current and the average usage rate exceeds the rated capacity of the inverter transformer 160 (S202).

For example, as shown in FIG. 5, when the current value and the average usage rate of the average welding current for the fixed number of points are A5 and α5, respectively, the determination unit 140 plots an intersection of the current value A5 and the average usage rate α5 on the graph drawn using the equivalent current curve a stored in the storage unit 135. When the plotted intersection is positioned below the equivalent current curve a, the determination unit 140 determines that a relationship between the current value A5 and the average usage rate α5 does not exceed the rated capacity of the inverter transformer 160 (S202: NO). When the relationship does not exceed the rated capacity, the determination unit 140 continues the operation of the control unit 120 and repeats the processing of steps S200 and S201.

Meanwhile, for example, as shown in FIG. 5, when the current value and the average usage rate of the average welding current for the fixed number of points are A6 and α6, respectively, the determination unit 140 plots an intersection of the current value A6 and the average usage rate α6 on the graph drawn using the equivalent current curve a stored in the storage unit 135. When the plotted intersection is positioned above the equivalent current curve a, the determination unit 140 determines that a relationship between the current value A6 and the average usage rate α6 exceeds the rated capacity of the inverter transformer 160 (S202: YES). When the relationship exceeds the rated capacity, the determination unit 140 stops the operation of the control unit 120 and outputs an abnormality (S203). The output of the abnormality is performed for each fixed number of points. For example, when it is determined that the relationship exceeds the rated capacity at a completion of the fixed number of points, the abnormality is output before welding at the next point. The processing after the output of the abnormality is the same as in step S103.

As described above, when the average usage rate measurement mode is activated, it is determined for each fixed number of points whether the rated capacity of the inverter transformer 160 is exceeded or not exceeded. The resistance welder 10 can be thus operated within a range not exceeding the rated capacity of the resistance welder 10, and the diodes 172 and 174 included in the inverter transformer 160 can be protected from overheating similarly to the usage rate measurement mode. This can extend the life of the diode stack 170 and reduce a frequency of replacement of the diode stack 170. Further, considering that the replacement of the diode stack 170 takes a significant amount of time, production efficiency of a welding line can be improved.

As described above, the resistance welder controller 100 of the embodiment can prevent a rectifier element such as the diodes 172 and 174 from deteriorating. This can prevent a situation where the resistance welder 10 such as a welding robot suddenly stops due to the deterioration of the diodes 172 and 174 and the production line is forced to stop for a long time for a replacement of the diode stack 170 together with the inverter transformer 160. Further, the life of the inverter transformer 160 can be extended and the diodes can be preventively maintained, and thus the diode stack 170 can be replaced as scheduled.

Although the embodiment of the resistance welder controller according to the present invention has been described above, the technical scope of the present invention is not limited to the description of the embodiment. What is not explicitly described in the embodiment but modified by those skilled in the art within the scope of the claims is included in the technical scope of the present invention.

REFERENCE SIGNS LIST

10 Resistance welder
100 Resistance welder controller
110 Rectification unit
115 Switching unit
120 Control unit
125 Current detection unit
130 Usage rate calculation unit
135 Storage unit
140 Determination unit
150 PC (external computer)
160 Inverter transformer
162 Transformer
164 Secondary winding
166 Primary winding
170 Diode stack
172, 174 Diode (rectifier)
182 Transformer temperature detection unit (temperature detection unit)
184 Rectifier temperature detection unit (temperature detection unit
190 Welding gun
200 Electrode

The invention claimed is:

1. A resistance welder controller comprising:
a control unit that controls a welding current flowing through an inverter transformer;
a current detection unit that detects the welding current flowing through the inverter transformer;
a usage rate calculation unit configured to active:
a usage rate measurement mode in which an energizing time and a point time interval of the welding current that has been detected for each point is measured and a usage rate of the inverter transformer using the energizing time and point interval time is calculated; and an average usage rate measurement mode in which the energizing time and the point time interval of the welding current that has been detected for each point or for a fixed time is measured, an average energizing time or an average point time interval for each of a plurality of points or for the fixed time is calculated, and the usage rate of the inverter transformer is calculated using the average energizing time or the average point time interval that have been calculate;

a storage unit that stores an equivalent current curve indicating a relationship between a current value of the welding current and the usage rate of the inverter transformer when the inverter transformer is operated at a rated capacity; and a determination unit that determines whether a relationship between the current value of the detected welding current and the calculated usage rate of the inverter transformer in either of the usage rate measurement mode or the average usage rate measurement mode exceeds the rated capacity of the inverter transformer based on the equivalent current curve, continues an operation of the control unit when the relationship between the current value of the detected welding current and the calculated usage rate of the inverter transformer does not exceed the rated capacity of the inverter transformer, and stops the operation of the control unit when the relationship between the current value of the detected welding current and the calculated usage rate of the inverter transformer exceeds the rated capacity of the inverter transformer.

2. The resistance welder controller according to claim 1, wherein the determination unit plots an intersection of the current value of the detected welding current and the calculated usage rate of the inverter transformer on a graph drawn using the equivalent current curve stored in the storage unit, determines that the relationship between the current value of the detected welding current and the calculated usage rate of the inverter transformer does not exceed the rated capacity of the inverter transformer when the plotted intersection is positioned below the equivalent current curve, and determines that the relationship between the current value of the detected welding current and the calculated usage rate of the inverter transformer exceeds the rated capacity of the inverter transformer when the plotted intersection is positioned above the equivalent current curve.

3. The resistance welder controller according to claim 2, wherein the current value of the welding current detected by the current detection unit and the usage rate of the inverter transformer calculated by the usage rate calculation unit are transmitted to an external computer, and the external computer plots the intersection of the current value of the detected welding current and the calculated usage rate of the inverter transformer on the graph drawn using the equivalent current curve stored in the storage unit, and monitors whether the relationship between the current value of the welding current and the usage rate of the inverter transformer exceeds the rated capacity of the inverter transformer.

4. The resistance welder controller according to claim 1, wherein the current value, the energizing time, and the point time interval of the welding current detected by the current detection unit, and the usage rate of the inverter transformer calculated by the usage rate calculation unit are transmitted to an external computer, and the external computer stores and monitors the current value, the energizing time, and the point time interval of the welding current, and the usage rate of the inverter transformer.

5. The resistance welder controller according to claim 4, further comprising a temperature detection unit that detects a temperature of the inverter transformer, wherein the temperature of the inverter transformer detected by the temperature detection unit is transmitted to the external computer, and the external computer stores and monitors the temperature of the inverter transformer.

6. The resistance welder controller according to claim 5, wherein the temperature detection unit includes a transformer temperature detection unit that detects a temperature of a transformer that generates the welding current, and a rectifier temperature detection unit that detects a temperature of a rectifier that rectifies the welding current generated by the transformer.

* * * * *